(12) United States Patent
Baker

(10) Patent No.: US 6,688,327 B1
(45) Date of Patent: Feb. 10, 2004

(54) WATER METER COVER

(76) Inventor: Mark C. Baker, 614 Jefferson, Hugoton, KS (US) 67951

( * ) Notice: Subject to any disclaimer, the term of this patent is extended or adjusted under 35 U.S.C. 154(b) by 0 days.

(21) Appl. No.: 10/292,311

(22) Filed: Nov. 12, 2002

(51) Int. Cl.[7] .......................... F16K 27/08; F16K 49/00
(52) U.S. Cl. ........................ 137/375; 137/377; 137/382
(58) Field of Search ................. 137/377, 382, 137/371, 375; 73/861.353

(56) References Cited

U.S. PATENT DOCUMENTS

| | | | |
|---|---|---|---|
| 3,548,864 A | 12/1970 | Handley | |
| 3,564,919 A | 2/1971 | Varga | |
| 3,717,963 A | 2/1973 | Sauriol | |
| 3,772,917 A | 11/1973 | Lutz et al. | |
| 3,915,185 A | * 10/1975 | Sanner | 137/78.3 |
| 3,974,599 A | 8/1976 | Grosh | |
| 4,048,766 A | 9/1977 | Dantzer et al. | |
| 4,248,271 A | 2/1981 | Burgess | |
| 4,282,761 A | 8/1981 | Rosaen | |
| 4,388,835 A | 6/1983 | Rosaen | |
| 4,422,325 A | 12/1983 | Sutherland et al. | |
| 4,798,239 A | * 1/1989 | Persohn et al. | 165/45 |
| 4,890,638 A | * 1/1990 | Davenport | 137/382 |
| 4,993,450 A | * 2/1991 | Dunn | 137/382 |
| 5,035,798 A | 7/1991 | Stenger | |
| 5,108,599 A | 4/1992 | Lowery | |
| D348,017 S | 6/1994 | Poleshuk et al. | |
| D349,661 S | 8/1994 | DeJarlais et al. | |
| 5,540,107 A | 7/1996 | Silverman et al. | |
| 5,822,173 A | 10/1998 | Dague et al. | |
| 6,021,804 A | * 2/2000 | Griffin et al. | 137/341 |
| 6,048,456 A | 4/2000 | Palmer | |
| 6,164,317 A | * 12/2000 | Hanson | 137/377 |
| 6,206,030 B1 | * 3/2001 | Barthuly | 137/341 |
| 6,250,151 B1 | 6/2001 | Tingleff et al. | |
| 6,293,301 B1 | * 9/2001 | Griffin et al. | 137/382 |

* cited by examiner

Primary Examiner—A. Michael Chambers
(74) Attorney, Agent, or Firm—Kenneth H. Jack; Davis & Jack, LLC

(57) ABSTRACT

A water meter cover including a pipe segment having an outside diameter, having upper and lower ends, and having annular outer and inner surfaces; a pipe cap closely fitted to the outside diameter of the pipe segment, the pipe cap having a downwardly facing surface; a first adhesive layer disposed between the pipe cap and pipe segment, the first adhesive layer fixedly attaching the pipe cap to the upper end of the pipe segment; an elastic foam sheet having an outer surface; and a second adhesive layer disposed between the elastic foam sheet and the pipe segment, the second adhesive layer fixedly attaching the outer surface of the elastic foam sheet to the annular inner surface of the pipe segment.

10 Claims, 3 Drawing Sheets

WATER METER COVER

FIELD OF THE INVENTION

This invention relates to water meters. More particularly, this invention is relates to articles and assemblies adapted for protecting water meters and their housings from damage resulting from impacts or weathering.

BACKGROUND OF THE INVENTION

A common water meter assembly for measuring water flow through large water pipes (for example, a ten inch water pipe) comprises a tubular support column having an annular meter mounting flange or base extending laterally outward from its upper end. The tubular support column typically has saddle-shaped pipe mounting bracket at its lower end. The tubular support column houses an rotary actuator cable which extends downwardly from the saddle bracket and through an aperture within the wall of the water pipe, the upper end of such cable extending upwardly above the annular base. An impeller assembly operatively connected to the lower end of the rotary actuator cable variably or intermittently rotates in response to varying and intermittent water flow within the pipe, while a geared metering mechanism mounted upon and operatively connected to the upper end of the rotary actuator cable records rotations, resulting in metering of such water flow. A plastic or metal housing fitted for covering the geared meter mechanism is typically provided, a lower end of the plastic housing typically being annularly and outwardly flanged, such flange being abuttingly mounted upon the annular base.

A drawback or deficiency of the above described water meter assembly is that typical lid and mounting flange components of such housing commonly imperfectly seal the housing's interior pace, allowing moisture from rain or ice build up to undesirably encroach inward. Moisture within such housing undesirably results in degradation of mechanical elements housed therein. Another drawback or deficiency of such common water meter assembly is that its housing, when made of plastic, may degrade over time as result of exposure to ultra-violet light. Another drawback or-deficiency of such common water meter assembly is that its housing and the contents of the housing may become damaged as result of impacts from objects such as hail stones striking the housing.

The instant inventive water meter cover solves or ameliorates all of the drawbacks and deficiencies discussed above by providing a mechanically simple and economically constructed water meter cover, such cover incorporating structure which dually performs a weather sealing function and an annular clamp mounting function.

BRIEF SUMMARY OF THE INVENTION

A first major structural component of the instant inventive water meter cover comprises a short length or segment of inexpensively obtained polyvinylchloride (PVC) plastic pipe.

A second major structural component of the instant invention comprises an inexpensively obtained PVC plastic pipe cap, such cap having an annular inner surface and being fitted for covering an end of a PVC pipe having a gauge matching that of the pipe segment.

In assembly of the instant inventive meter cover, a thin layer of an adhesive is disposed over the annular inner surface of the PVC pipe cap, or alternately, over the annular outer surface of the PVC pipe segment at such segment's upper end. Immediately thereafter, the upper end of the PVC pipe segment is telescopingly and nestingly inserted upwardly into the concavity of the PVC pipe cap, such insertion allowing the thin adhesive layer to fixedly and permanently mount the pipe cap over the upper opening of the pipe segment.

A third major structural component of the instant inventive water meter cover comprises a first sheet of durable elastic foam material, preferably neoprene rubber. Preferably, said first sheet is rectangular and has a vertical dimension closely matching the vertical dimension of the PVC pipe segment.

In assembly of the instant invention, a second quantity of adhesive is disposed over the annular inner surface of the pipe segment or upon the outer surface of the elastic foam sheet. Immediately thereafter, the elastic foam sheet is placed and positioned annularly within the hollow bore of the PVC pipe segment, such positioning allowing such adhesive layer to fixedly and permanently position the elastic foam sheet as an annular lining of such bore. Preferably, the lateral dimension of the elastic foam sheet is closely fitted so that it extends completely and annularly about the circumference of the bore of the PVC pipe segment. Preferably, the opposing ends of such sheet abut each other, such abutment forming a weather sealing vertical seam. Suitably, such abutment may be adhesively joined, enhancing such joint's weather sealing function.

A second sheet of impact absorbing elastic foam material, preferably neoprene rubber, is preferably similarly fixedly mounted upon the downwardly facing inner surface of the PVC pipe cap. Preferably, such second sheet of elastic foam is circular, matching the shape of the downwardly facing inner surface of the PVC pipe cap.

In use and operation of the instant inventive water meter cover, the lower opening of the cover is positioned directly over a water meter of the type described above, such positioning axially aligning the cover with the meter. Thereafter, the water meter cover is installed by manually pressing downwardly, causing the water meter to telescopingly extend upwardly into the water meter cover's hollow concavity. Such downward pressing and upward telescoping installing motion is preferably continued at least until the lower annular base and mounting flange structures of the water meter lie within the water meter cover's concavity. Preferably, such installing motion continues until an upper surface of the water meter's housing or lid contacts the overlying sheet of impact absorbing elastic foam.

Preferably, the water meter cover is fitted for use upon a particular brand of water meter, such fitting preferably assuring that water meter cover's inside diameter is slightly less than the outside diameters of the water meter housing's annular mounting flange and annular base plate. As a result of such preferred fitted relationship, upon completion of the above described downward pressing and upward telescoping meter cover installation, the water meter's annular base and mounting flange are positioned for outward extension into the first elastic foam sheet. Such outward extension deflects the inner surface of the first elastic foam sheet to an annular channel, such channel opening inwardly and extending outwardly from said sheet's annular inner surface.

At the annular floor of such annular channel, the first sheet of elastic foam material tends to compressively press inwardly upon or annularly inwardly clamp upon the water meter's annular base and mounting flange. Such clamping function securely and removably mounts the water meter cover upon the water meter housing. Also, at such annular floor of such channel, a hermetic weather seal is further provided.

Accordingly, an object of the present invention comprises provision of a water meter protecting cover which is economically fabricated or constructed through the provision of inexpensively obtained PVC plastic piping, a PVC plastic pipe cap, and elastic foam sheet material.

A further object of the present invention comprises the provision of such a cover which is mechanically simply constructed.

A further object of the present invention is the provision of such a cover having an elastic foam component which dually functions for weather sealing and for providing annular clamping support of the cover.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
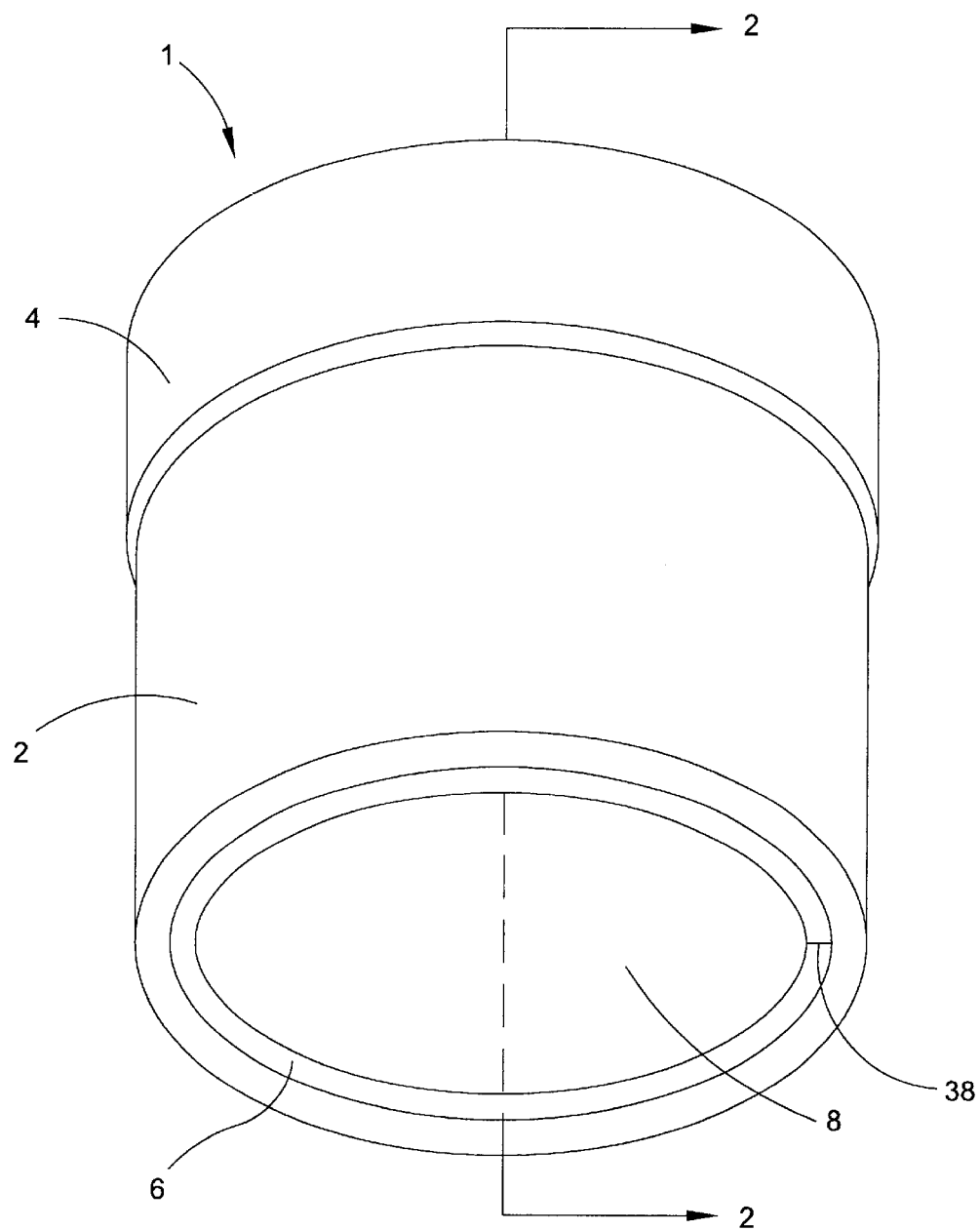
FIG. 1 is an isometric view of the instant inventive water meter cover.

Referring now to the drawings, and in particular to FIG. 1, the instant inventive water meter cover is referred to generally by Reference Arrow 1. A preferred embodiment of the water meter cover comprises a polyvinylchloride plastic pipe segment 2 covered by a polyvinylchloride plastic pipe cap 4, the annular inner surface of the pipe segment 2 being covered or lined by a rectangular sheet of elastic foam material 6. Preferably, the sheet of elastic foam material 6 comprises neoprene rubber.

Figure 2:
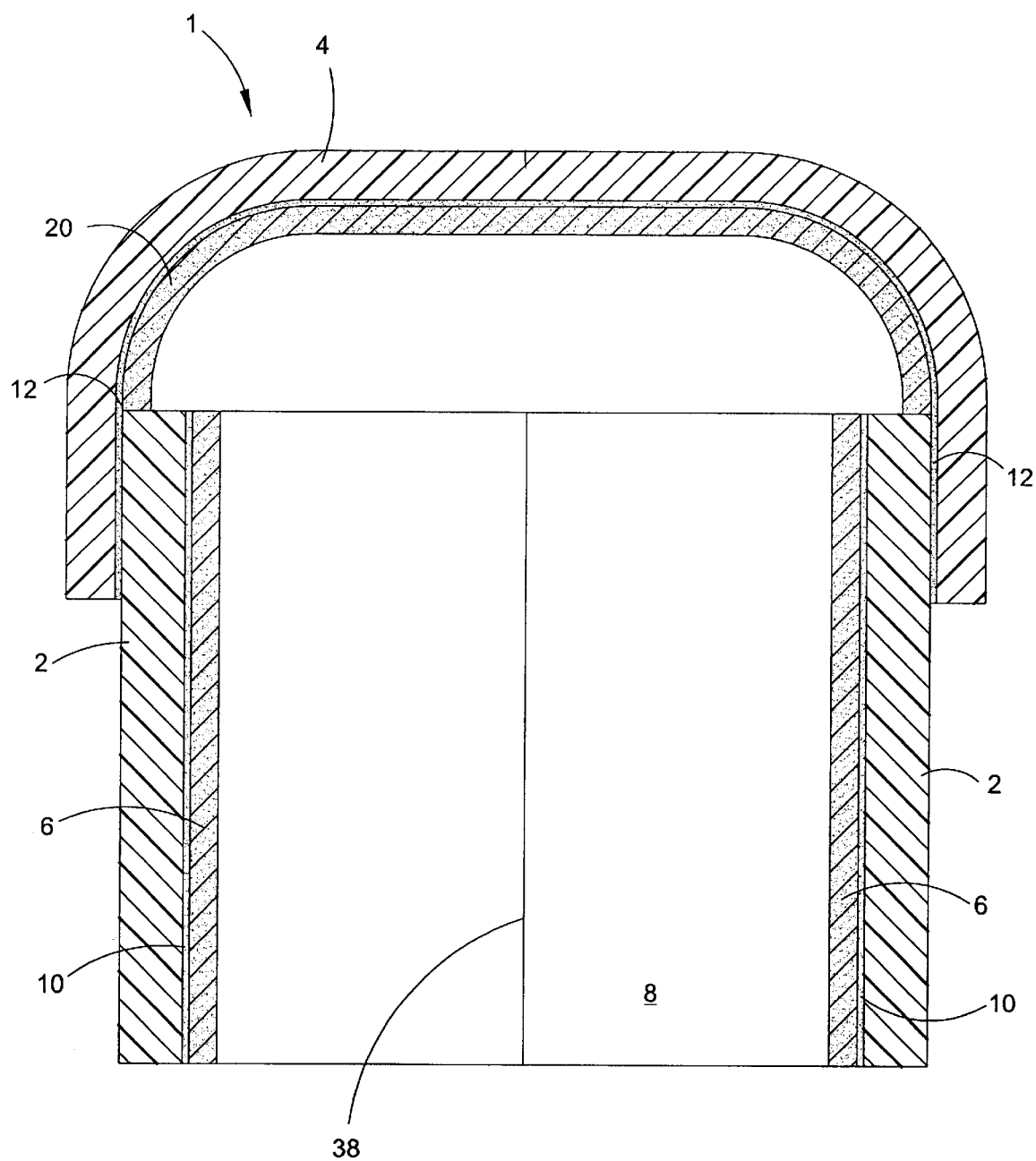
FIG. 2 is a sectional view as indicated in FIG. 1.

Referring simultaneously to FIGS. 1 and 2, the preferred rectangular sheet of neoprene rubber 6 is fixedly and annularly attached to the annular inner surface of PVC pipe segment 2 by an adhesive layer 10. Preferably, the neoprene sheet 6 extends completely circumferentially about the inner surface of pipe segment 2, forming a tightly abutting vertically oriented weather sealing seam 38. Preferably, such seam 38 is further adhesively joined, enhancing such seam's weather sealing capacity.

Referring further simultaneously to FIGS. 1 and 2, adhesive layer 12 fixedly attaches the PVC pipe cap 4 to the upper end of the PVC pipe segment 2. Said adhesive layer 12 preferably is further disposed upwardly and inwardly over the downwardly facing surface of PVC pipe cap 4. Such upward and inward extension of adhesive layer 12 preferably fixedly attaches and mounts a circular sheet of impact absorbing elastic foam material 20. Preferably, such circular sheet 20 comprises neoprene foam rubber.

Figure 3:
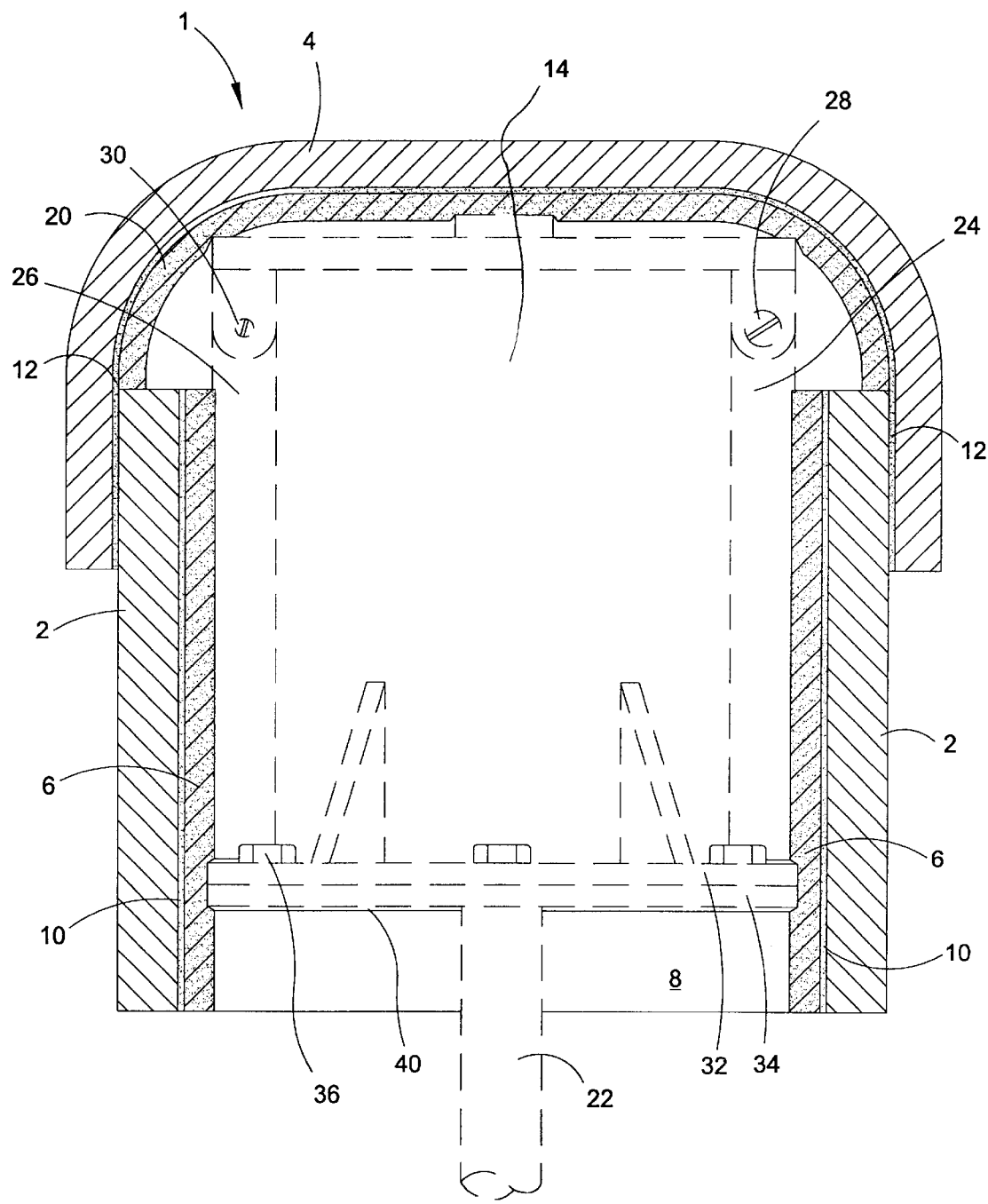
FIG. 3 redepicts FIG. 2, the figure additionally depicting in ghost a water meter covered by inventive cover.

Referring to FIG. 3, the housing 14 of water meter 22, drawn in ghost, has an upper lid mounted by screws or pins 28 and 30, the housing 14 having laterally opposed and outwardly extending structural ridges 24 and 26. The lower end of the water meter housing 14 typically forms an annular outwardly extending mounting flange 32, such flange 32 being fixedly mounted by threaded bolts or screws 36 upon an annular mounting base 34 of the water meter 22.

Referring simultaneously to FIGS. 1 and 3, upon manually installing the water meter cover 1 downwardly over water meter 22, causing the water meter 22 to telescopingly extend upwardly into the interior space 8 of the water meter cover 1, the annular flange and base structures 32 and 34 tend to protrude annularly outward and into elastic foam sheet 6. Such outward protrusion forms an outwardly deflected annular channel 40. The annular floor of such channel 40 serves dual functions of hermetically sealing the housing 14, and annularly clamping the meter cover 1 upon the water meter 22.

Referring further to FIG. 3, the housing 14 preferably is completely upwardly telescoped into the interior space 8 of the water meter cover 1, causing upper surfaces of the housing 14 to contact the impact absorbing elastic foam sheet 20. Upon impacting contact of objects such as hail stones upon upper surfaces of the PVC pipe cap 4, the elastic foam sheet 20 serves to protect the housing 14 from damage.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A water meter cover comprising:
   (a) a pipe segment having an outside diameter, having upper and lower ends, and having annular inner and outer surfaces;
   (b) a pipe cap closely fitted to the outside diameter of the pipe segment, the pipe cap having a downwardly facing inner surface;
   (c) a first adhesive layer disposed between the pipe cap and the pipe segment, the first adhesive layer fixedly attaching the pipe cap to the upper end of the pipe segment;
   (d) a first elastic foam sheet having inner and outer surfaces; and
   (e) a second adhesive layer disposed between the first elastic foam sheet and the pipe segment, the second adhesive layer fixedly attaching the outer surface of the first elastic foam sheet to the annular inner surface of the pipe segment.

2. The water meter cover of claim 1 further comprising a second elastic foam sheet having an upper surface and a third adhesive layer disposed between the second elastic foam sheet and the pipe cap, the third adhesive layer fixedly attaching the upper surface of the second elastic foam sheet to the pipe cap's downwardly facing inner surface.

3. The water meter cover of claim 2 wherein the pipe segment comprises polyvinylchloride plastic.

4. The water meter cover of claim 3 wherein the pipe cap comprises polyvinylchloride plastic.

5. The water meter cover of claim 4 wherein the first elastic foam sheet has abutting opposite ends, wherein said sheet extends annularly over the annular inner surface of the pipe segment, and further comprising a vertically oriented seal, said seal seal comprising the abutment of the opposite ends.

6. The water meter cover of claim 5 wherein the inner surface of the elastic foam sheet is annular, and further comprising an annular inwardly opening meter clamping and sealing channel, said channel extending outwardly from the annular inner surface of the first elastic foam sheet.

7. The water meter cover of claim 1 wherein the pipe segment comprises polyvinylchloride plastic.

8. The water meter cover of claim 7 wherein the pipe cap comprises polyvinylchloride plastic.

9. The water meter cover of claim 8 wherein the first elastic foam sheet has abutting opposite ends, wherein said sheet extends annularly over the annular inner surface of the pipe segment, and further comprising a vertically oriented seal, said seal comprising the abutment of the opposite ends.

10. The water meter cover of claim 9 wherein the inner surface of the first elastic foam sheet is annular, and further comprising an annular inwardly opening meter clamping and sealing channel, said channel extending outwardly from the annular inner surface of the first elastic foam sheet.

* * * * *